J. HARE.
Belt-Coupling.

No. 166,457. Patented Aug. 10, 1875.

WITNESSES.

INVENTOR

UNITED STATES PATENT OFFICE.

JAMES HARE, OF PROVIDENCE, RHODE ISLAND, ASSIGNOR TO JOSIAH A. WHITMAN, OF SAME PLACE.

IMPROVEMENT IN BELT-COUPLINGS.

Specification forming part of Letters Patent No. 166,457, dated August 10, 1875; application filed June 21, 1875.

*To all whom it may concern:*

Be it known that I, JAMES HARE, of the city and county of Providence, in the State of Rhode Island, have invented a certain new and useful Improvement in Belt-Couplings, being an improvement on my patent for belt-couplings dated March 30, 1875, No. 161,508; and I do hereby declare that the following is a full and true description of the construction and operation of the same, reference being had to the annexed drawings making a part of this specification, and to the letters and figures marked thereon.

Figure 1:
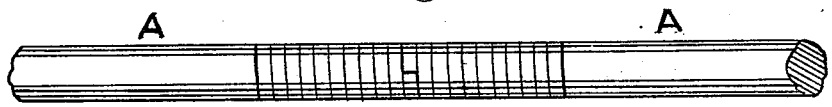
Figure 2:
Figure 3:
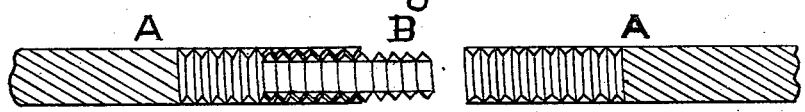

Figure 1 is a representation of the coupling when attached to the belt ready for use. Fig. 2 represents the two parts of the coupling attached to the belt ready for screwing together. Fig. 3 is a sectional view of the coupling and belt cut through the center.

This invention consists in constructing a flexible, yielding, or elastic belt-coupling from triangular wire, wound in spiral form, with the apex of the triangular wire on the inside to form a perfect screw-thread or female screw; and, the wire being spring-tempered, the coupling thus formed is elastic, and can be bent in any direction, and forms a smooth exterior surface. It also consists in forming a coupling for belts by using two separate outside parts of the coupling, constructed as above described, and united together by a third part, made from the same-sized triangular wire, smaller in diameter, and having the apex of the triangle on the outside, or the wide base on the inside, so that it forms a screw-thread on its periphery, and will screw and fit into the outer pieces of the coupling.

A A represent the two outer parts of the coupling, formed of triangular wire bent around a round mandrel of the proper size, with the apex of the triangle next the mandrel, thus forming a perfect female screw. When these couplings are thus formed they are tempered to be springs, when they will yield or bend in any direction. A' is the belt to be coupled. B represents the internal part of the coupling made from the same-sized triangular wire, but formed to have the apex of the triangular wire upon its outside, and of such diameter as to screw into and fit in the female screw of the couplings A. This part is also tempered, so as to readily yield with the parts A, and can be of any desired length to accommodate the couplings in adjusting the length of the belt.

By constructing the helical coupling from triangular wire the angle forming the screw-thread will take into the leather of the belt, or other material of which the belt is made, much easier, and will leave more substance between the screw-threads to draw upon than any other form of wire; hence it has a better hold upon the belt, and will not slip so easily as other forms of wire, for the harder the strain on the belt the firmer the coupling holds; and another advantage it has over other forms is, it forms a screw-thread for both male and female screws to be coupled together and held by the interior or male screw. It also forms a cheap and durable coupling, one that can be put onto belts or taken off quickly by simply screwing one end of the parts A upon a slightly-reduced end of the belt A', and then screwing the other upon the male screw B, or reversing the operation will remove the coupling from the belt, or simply unscrewing the meeting ends of the couplings A from the male screw B separates the coupling.

The coupling can be made of one piece, A, by screwing each end onto the belt; but I prefer to have the two pieces A and the interior male-screw coupling B. Any yielding metal wire may be used to form the coupling; but preference is given to steel wire and tempered to a spring temper.

Having thus described my invention, what I claim is—

1. An elastic belt-coupling, A, made of triangular wire, the internal apexes of which form screw-threads, as and for the purposes described.

2. An elastic belt-coupling formed by the combination of the two parts A A, having the internal screw-threads thereon, and the internal part or male screw B, having external screw-threads, substantially as described.

JAMES HARE.

Witnesses:
WM. H. HERRICK,
GEO. S. WHITMAN.